Feb. 22, 1955 — A. C. TUTTLE — 2,702,513
ANCHORING DEVICE FOR LADING STRAPS AND OTHER CARGO BINDING ELEMENTS
Filed Oct. 29, 1949 — 2 Sheets-Sheet 1
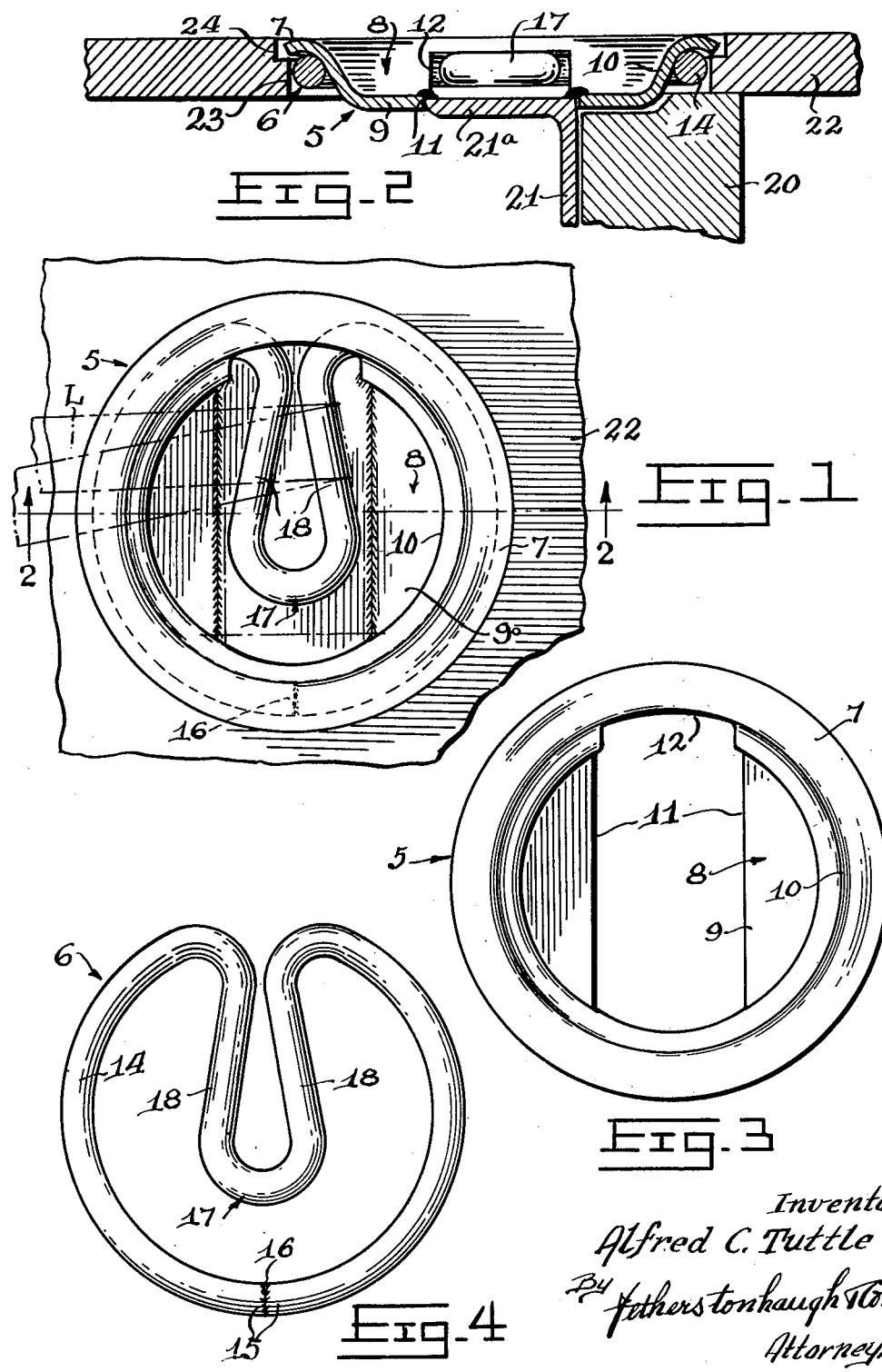
Inventor
Alfred C. Tuttle
By Fetherstonhaugh & Co.
Attorneys Feb. 22, 1955      A. C. TUTTLE      2,702,513
ANCHORING DEVICE FOR LADING STRAPS
AND OTHER CARGO BINDING ELEMENTS
Filed Oct. 29, 1949      2 Sheets-Sheet 2
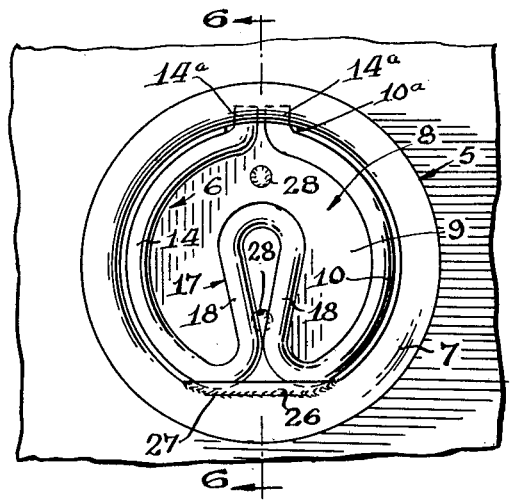
Fig. 5
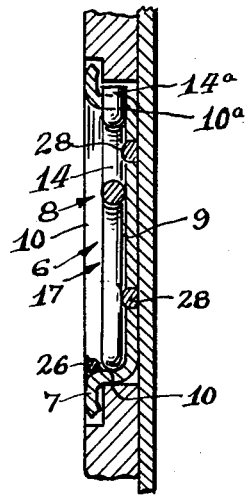
Fig. 6
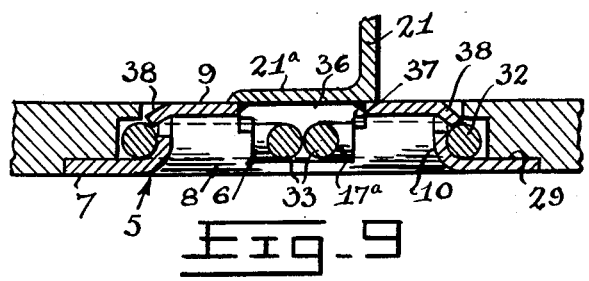
Fig. 9
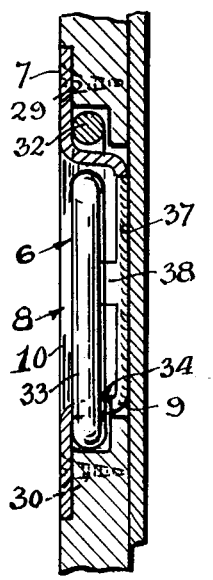
Fig. 8
Fig. 7
Inventor
Alfred C. Tuttle
By Fetherstonhaugh & Co.
Attorneys – # United States Patent Office 2,702,513
Patented Feb. 22, 1955

2,702,513

ANCHORING DEVICE FOR LADING STRAPS AND OTHER CARGO BINDING ELEMENTS

Alfred C. Tuttle, Montreal, Quebec, Canada

Application October 29, 1949, Serial No. 124,458

21 Claims. (Cl. 105—369)

This invention relates to improved means for anchoring lading straps, wires, ropes and similar cargo binding elements used in railway freight cars and other freight carriers.

One object of the invention is to provide an anchoring device for cargo binding elements which is characterized by cheapness, simplicity of design, sturdiness, ease of application and elimination of sharp or projecting edges likely to damage the cargo or lading.

Another object is the provision of an anchoring device which, when applied to the wall of a freight car, protects and strengthens the sheathing or lining of the wall and also serves to transfer directly to the framework of the car the shocks and continuous stresses transmitted to the anchoring device by the attached cargo binding element.

Another object is the provision of a self-clearing anchoring device designed so that grain or other bulk cargo accumulating therein during the loading of a freight car in which the anchoring device is installed will readily flow out of the anchoring device during unloading of the car.

Other objects, advantages and characteristic features of the invention will be apparent from the following detailed description of the accompanying drawings, in which several embodiments of the invention are disclosed and in which—

Fig. 1 is an inside elevational view of a portion of the wall of a railway freight car having one form of my improved anchoring device applied thereto.

Fig. 2 is a sectional view taken substantially along the section line 2—2 of Fig. 1.

Fig. 3 is a plan view of a dished plate member forming part of the anchoring device shown in Figs. 1 and 2.

Fig. 4 is a detail view showing a post-carrying member forming part of the complete anchoring device assembly shown in Figs. 1 and 2.

Fig. 5 is a view similar to Fig. 1 but showing a modified form of anchoring device.

Fig. 6 is a sectional view taken substantially along the section line 6—6 of Fig. 5.

Fig. 7 is a view similar to Fig. 1 but showing a further modification of the anchoring device.

Fig. 8 is a sectional view taken substantially along the line 8—8 of Fig. 7.

Fig. 9 is a sectional view taken substantially along the line 9—9 of Fig. 7.

The anchoring device embodied in the installation shown in Figs. 1 to 4 inclusive comprises a dished plate member 5 having a post-carrying member 6 associated therewith.

As here shown, plate member 5 comprises a one-piece sheet metal pressing shaped to provide an outwardly directed marginal flange 7 extending around the mouth of a shallow cavity 8 defined by a bottom wall 9 and a marginal wall 10. The bottom wall 9 is bisected by a slot 11 communicating at one end with a slot 12 provided in the marginal wall 10. The marginal flange 7 is transversely curved as shown in Fig. 2 so that the surface of the flange which faces generally in the same direction as the mouth of cavity 8 is convex while the opposite surface of the flange is concave. It will be noted that the transverse curvature of flange 7 is such that the free outer edge of the flange is positioned an appreciable distance below the plane of the mouth portion of cavity 8.

The post-carrying member 6 is formed by bending a single piece of high strength spring steel to provide a split ring 14 having its free ends 15 welded together as indicated at 16 and having an intermediate portion thereof looped inwardly as indicated at 17 to provide an anchoring post whose side portions 18 diverge as they approach the bight or inner closed end of the loop, thereby giving the anchoring post the contour of a wedge.

The plate member 5 and post-carrying member 6 are assembled by fitting the ring 14 over the dished portion of the plate member so that the ring encircles the outer surface of the cavity defining wall 10 and underlies the concave surface of flange 7 with the post-forming loop 17 extending into cavity 8 through slot 12. This assembly is then applied to the wall structure of a railway freight car as illustrated in Figs. 1 and 2 wherein the framing members of the wall structure are represented by the furring 20 and the metal Z-post 21 and the inside lining is indicated at 22. In this connection it will be noted that the lining 22 is provided with an opening 23 in which the anchoring device is fitted so that the ring 14 of post-carrying member 6 lies between the wall of lining opening 23 and the marginal wall 10 of cavity 8. It will also be noted that a portion of the flange 21a of Z-post 21 is received between and welded to the side edges of the slot 11 formed in the bottom wall 9 of cavity 8.

It is very advantageous to have the post-carrying or stress-distributing member 6 and the plate member 5 separate. Member 6 being of high strength spring steel, it would be very difficult to weld it to a structural element in a freight car or the like. However, the plate member 5 can be easily welded to such a structural member.

The lining opening 23 is enlarged at its inner end to provide a rabbet or recess 24 in which the outer edge of flange 7 of plate member 5 is accommodated and is thus prevented from coming into damaging contact with the cargo.

In the use of the anchoring device described herein a cargo binding element, such as the lading strap indicated at L in Fig. 1, is looped around the anchoring post 17. The stresses imposed on post 17 by the cargo binding element L are transmitted by ring 14 and plate member 5 directly to the Z-post 21. In this connection it may be pointed out that the ring 14 acts as a stress-distributing ring by means of which the stresses imposed on the anchoring post 17 by the lading strap are transmitted to the overlying flange 7 and to the cavity defining wall 10 of plate member 5 through which said stresses are transferred directly to the framing structure of the car wall by the welded connection provided between the plate member 5 and the Z-post flange 21a. In order to provide an adequate margin of safety against failure in service it is important that the post-carrying member 6 be made of high strength spring steel such as heat-treated carbon spring steel and that the ends of the ring portion be welded together as indicated at 16, with the weld preferably disposed directly opposite the bight of the post-forming loop 17.

In the installation shown in Figs. 1 to 4 inclusive, the post-carrying member 6 is free of direct attachment to plate member 5 so that when these assembled members are secured to the wall structure of the car, as shown in Fig. 2, the ring 14 and its anchoring post 17 are free to have a limited movement relative to plate member 5 in the axial direction of the ring so that the post member 17 may be displaced forwardly of the bottom wall 9 of cavity 8 to permit the lading strap L to be looped therearound and so that the pull of the lading strap on the anchoring post 17 will pull the ring 14 into stress transmitting engagement with the flange 7 and wall member 10 of plate member 5.

In the modified installation shown in Figs. 5 and 6 the post-carrying member 6 is arranged within the cavity 8 of plate member 5 with ring 14 lying close to the inner surface of the cavity defining wall 10 and with the ends 14a of the ring directed outwardly through a slot 10a in wall 10. The portion of ring 14 from which the post-forming loop 17 extends into cavity 8 is confined between the bottom wall 9 of the cavity and a retaining member 26 which is welded in place as indicated at 27. It will also be noted that, in the installation shown in Figs. 5 and 6, the bottom wall 9 of cavity 8 is a solid wall which is welded to the Z-post flange 21a by plug welding indicated at 28.

In the modified installation shown in Figs. 7 to 9 inclusive, the flange 7 of plate member 5 is formed as a perfectly flat flange which is fitted in a rabbet or recess 29 corresponding to that indicated at 24 in Figs. 1 to 4 inclusive and is secured to the lining 22 by screws 30. The post-carrying member shown in Figs. 7 to 9 inclusive comprises a spring steel ring 32 having end portions 33 thereof directed into cavity 8 of plate member 5 through a slot 34 provided in the marginal wall 10 of the cavity. These inwardly extending end portions 33 of ring 32 are made of substantial length and are welded together in side by side relation to form an anchoring post 17a equivalent to that formed by the inwardly directed loop 17 of the ring 14 previously described.

It will also be noted that, in the installation shown in Figs. 7 to 9 inclusive, the bottom wall 9 of cavity 8 is butted against the adjacent face of Z-post flange 21a and is provided with a slot 36 of a width less than the width of said flange, the side edges of said slot being welded to said flange as indicated at 37.

The plate member 5 shown in Figs. 7 to 9 inclusive is provided with ring-retaining tongues 38 struck therefrom and engaging the ring 32 of post-carrying member to hold said ring and plate member in assembled relation.

In each of the installations described herein the lining of the car wall is strengthened and protected by the plate member 5 of the anchoring device and all stresses to which the component parts of the anchoring device are subjected by the pull of the lading strap or other binding element looped around the anchoring post carried by the stress distributing ring are ultimately transferred through the ring and the plate member 5 to the Z-post 21 constituting part of the frame structure of the car wall. The component parts of the anchoring device are designed so that maximum strength is obtained both longitudinally and laterally in proportion to the car structure itself. The curvature of the plate member 5 at the flange 7 and at the juncture of the cavity defining walls 9 and 10 is such as to eliminate pockets in which bulk cargo such as grain is likely to accumulate and be trapped. The transverse curvature of the flange 7 in the installation shown in Figs. 1 to 7 inclusive and the disposal of this flange within a recess or rabbet in the car lining eliminates any possibility of the edge of the flange coming into damaging contact with articles of lading positioned adjacent the lining. The wedge-shape contour of the anchoring post embodied in each installation substantially eliminates danger of the looped portion of the lading strap slipping off the anchoring post when the lading strap is tensioned around the lading.

With reference to the ring retaining tongues 38 shown in Figs. 8 and 9, it will be understood that similar tongues may be provided on the plate member of the installation shown in Figs. 1 to 3 inclusive to retain the plate member and the post-carrying member in their assembled relation. It will also be understood that the plate member of the installation shown in Figs. 1 to 3 inclusive may be provided with a solid bottom wall 9 which is welded to the Z-post 21 in the same manner as the plate member shown in Figs. 5 and 6. Similarly the plate member 5 shown in Fig. 1 may be welded to the Z-post 21 in the same manner as the plate member 5 shown in Figs. 7 to 9 inclusive. The post-carrying member shown in Figs. 7 to 9 inclusive may be replaced by a post-carrying member of the type shown in Figs. 1, 2 and 4. It may be further noted that the bottom wall of the plate member 5 shown in Figs. 5 and 6 may be slotted and welded to the Z-post 21 either in the manner shown in Fig. 2 or in the manner shown in Fig. 9. It may also be pointed out that the circular shape of the post-carrying member and the associated plate member of the anchoring device is not essential since these members may be square or of any other suitable contour.

Having thus described the nature of my invention and various embodiments and modifications, it will be understood that various other modifications may be resorted to within the scope and spirit of the invention as defined by the appended claims.

I claim:

1. An anchoring device for cargo-binding lading straps and the like used in railway freight cars and the like comprising a stress-distributing member consisting of a first portion of metal forming an at least partially closed plane geometric figure defining an opening, a post-forming portion connected at one end to said plane geometric figure, the free end of said post-forming portion extending into said opening and being spaced from said first portion of metal, and a plate member engaging said first portion of metal for securing said stress-distributing member to said freight car, and spaced from said post-forming portion so that a lading strap can be slipped over said post-forming portion.

2. An anchoring device for cargo-binding lading straps and other flexible cargo-binding elements used in railway freight cars and other vehicles, comprising a stress-distributing member consisting of a ring-shaped element having an intermediate portion thereof looped inwardly to provide an anchoring post extending partially across the central opening of the ring, and a plate member engaging said ring for securing said stress-distributing member to said freight car and spaced from said post so that a lading strap can be slipped over said post.

3. An anchoring device according to claim 2 in which the sides of said anchoring post diverge as they approach the inner or closed end of the loop.

4. An anchoring device for cargo-binding lading straps and other flexible cargo-binding elements used in railway freight cars and other vehicles, comprising a stress-distributing member consisting of a substantially ring-shaped element with the ends of the ring directed inwardly to provide an anchoring post extending partially across the central opening of the ring, and a plate member engaging said ring for securing said stress-distributing member to said freight car and spaced from said post so that a lading strap can be slipped over said post.

5. An anchoring device for cargo-binding lading straps and other flexible cargo-binding elements used in railway freight cars and other vehicles, comprising a stress-distributing ring and an anchoring post connected at one end to said ring, the free end of said post being disposed with the central opening of the ring but spaced therefrom, and a plate member engaging said ring for securing said stress-distributing member to said freight car and spaced from said post so that a lading strap can be slipped over said post.

6. An anchoring device for cargo-binding lading straps and other flexible cargo-binding elements used in railway freight cars and other vehicles, comprising a dished plate member presenting a cavity defined by a bottom wall and a marginal wall, a centrally apertured stress-distributing member extending around and in close proximity to the marginal wall of said cavity, and an anchoring post extending inwardly from said stress-distributing member and disposed within said cavity, means connected to said marginal wall and engaging said stress-distributing member to transfer stress applied to said anchoring post from a lading strap through said stress-distributing member to said dished plate member.

7. The combination with a wall structure including a wall lining and a frame member lying outwardly of said lining and having a portion thereof exposed through an opening in said lining, of an anchoring device for a lading strap or other cargo-binding element, said anchoring device comprising a dished plate member presenting a cavity defined by a bottom wall and a marginal wall, means forming a hole in said bottom wall, said marginal wall being disposed within the opening in the lining, a weld between the edges of the hole in said bottom wall and said frame member to join said plate to said frame member, a separately formed centrally apertured stress-distributing member extending around the outside of and in close proximity to the marginal wall of said cavity, an anchoring post carried by and extending inwardly from the stress-distributing member and disposed within said cavity, said stress-distributing member being secured between said frame member and said plate member so that stresses imposed on the anchoring post by the cargo binding element attached thereto are transmitted through the stress-distributing member and the plate member to said frame member.

8. An anchoring device for cargo-binding lading straps and other flexible cargo-binding elements used in railway freight cars and other vehicles, comprising a metal plate dished to provide a marginal flange extending around the mouth of a cavity defined by a bottom wall and a marginal wall and said bottom and marginal walls having a slot therein, a substantially continuous stress-distributing member extending around the outside of and in close proximity to said marginal wall and positioned beneath said flange for engagement therewith, and an anchoring post extending inwardly from said stress-distributing member through said slot and disposed within said cavity.

9. An anchoring device for cargo-binding lading straps and other flexible cargo-binding elements used in railway freight cars and other vehicles, comprising a dished plate member presenting a bottom wall and a marginal wall defining a cavity and a continuous flange extending outwardly from the marginal wall at the mouth of the cavity, a stress-distributing member extending around the outer surface of said marginal wall and positioned beneath said flange for engagement therewith, and an anchoring post extending inwardly from said stress-distributing member through an opening in said marginal wall, said post being disposed wholly within said cavity.

10. An anchoring device for cargo-binding lading straps and other flexible cargo-binding elements used in railway freight cars and other vehicles, comprising a dished plate member presenting a cavity defined by a bottom wall and a marginal wall, a separately formed, centrally apertured stress-distributing member extending around the inside and in close proximity to the marginal wall of said cavity, an anchoring post carried by and extending inwardly from the stress-distributing member and disposed within said cavity, and means for securing the plate member and the post-carrying stress-distributing member in their assembled relation.

11. An anchoring device for cargo-binding lading straps and other flexible cargo-binding elements used in railway freight cars and other vehicles, comprising a dished plate member presenting a cavity defined by a bottom wall and a marginal wall, a separately formed, centrally apertured stress-distributing member extending around the inside of and in close proximity to the marginal wall of said cavity, an anchoring post carried by and extending inwardly from the stress-distributing member and disposed within said cavity and means for securing the plate member and the post-carrying stress-distributing member in their assembled relation, said means comprising portions of the stress-distributing member which extend through the marginal wall of said cavity.

12. An anchoring device for cargo-binding lading straps and other flexible cargo-binding elements used in railway freight cars and other vehicles, comprising a dished plate member presenting a cavity defined by a bottom wall and a marginal wall, a separately formed centrally apertured stress-distributing member extending around and in close proximity to the marginal wall of said cavity, an anchoring post carried by and extending inwardly from the stress-distributing member and disposed within said cavity, and means for securing the plate member and the post-carrying stress-distributing member in their assembled relation, said means being constituted, in part, by a flange formed integral with the marginal wall of the cavity at the mouth of the cavity and, in part, by tongues extending outwardly from the marginal wall of the cavity and spaced from said flange, said stress-distributing member being held in place between said flange and said tongues.

13. An anchoring device for cargo-binding lading straps and other flexible cargo-binding elements used in railway freight cars and other vehicles, comprising a dished plate presenting a cavity defined by a bottom wall and a marginal wall, a ring-shaped stress-distributing member defining a circular opening, an anchoring post carried by said stress-distributing member and disposed within said opening, said stress-distributing member and said anchoring post being arranged within said cavity with the stress-distributing member extending around the said marginal wall of the cavity and means for securing said stress-distributing member to said plate, said means being constituted, in part, by outwardly directed end portions of the stress-distributing member extending outwardly through a slot in the marginal wall of the cavity and, in part, by a retaining member secured to the marginal wall of the cavity and overlying a portion of the stress-distributing member remote from the outwardly directed ends of said member.

14. An anchoring device for cargo-binding lading straps and other flexible cargo-binding elements used in railway freight cars and other vehicles, comprising a dished plate member presenting a marginal flange extending around the mouth of a cavity defined by a bottom wall and a marginal wall, a separately formed stress-distributing member extending around and in close proximity to the outer surface of said marginal wall and positioned beneath said flange and in engagement therewith, end portions of said stress-distributing member being extended into said cavity through an opening in the marginal wall of the cavity to provide an anchoring post for a lading strap or similar cargo-binding element.

15. An anchoring device for cargo-binding lading straps and other flexible cargo-binding elements used in railway freight cars and other vehicles, comprising a single length of metal forming a split stress-distributing ring having an intermediate portion thereof looped inwardly to provide an anchoring post extending partially across the central opening of the ring and having end portions thereof directed outwardly in substantially parallel relation with each other, and a plate member engaging said ring for securing said stress-distributing member to said freight car and spaced from said post so that a lading strap can be slipped over said post.

16. An anchoring device for lading straps and other flexible cargo-binding elements, comprising a dish-shaped strain distributing member having a base wall and a marginal wall in outwardly diverging relation thereto, said base wall having a central supporting structure receiving opening extending into said diverging wall, and an anchoring post carried by said member and extending through said opening in said diverging wall in overhanging relation to said base wall.

17. The structure according to claim 16 wherein said anchoring device is a rigid structure, the said base wall having a flat mounting surface in a plane parallel with and spaced from the plane of the outer edge of the marginal wall, opposed edges of said opening in the base wall providing for the welding of the structure to a metal supporting structure, said anchoring post being disposed in a plane intermediate said first planes and parallel therewith, and said anchoring post being disposed between said opposed opening edges with its free end in spaced relation to said marginal wall to provide a clearance for the looping of a cargo binding element around the said post.

18. The structure according to claim 16, wherein said anchoring post is of less overall cross section adjacent said marginal wall than adjacent its free end.

19. The structure according to claim 16, wherein said marginal wall terminates in an outwardly directed flange concave toward said base wall, and said anchoring post comprising a loop member projecting radially inwardly from a ring member seated in said concave flange in surrounding relation to said marginal wall.

20. An anchoring device for lading straps comprising a rigid centrally dished strain distributing member providing a bottom wall and a marginal wall in parallel spaced planes and connected by an inclined side wall, said bottom wall having means for welding spaced portions thereof to a metal supporting structure comprising a centrally arranged transversely disposed opening therein providing spaced edge weld attaching portions, an anchoring post extending into the dished portion of said member from said side wall and disposed between said bottom and marginal wall portions, and the free end portion of said anchoring post overlying the opening of said bottom wall, and with surface portions thereof in spaced diverging relation to all said walls to freely receive the looped end of a lading strap therearound.

21. The structure recited in claim 20 wherein the said anchoring post is of materially greater width at its free end portion than at its opposite end portion adjacent said side wall.

References Cited in the file of this patent

UNITED STATES PATENTS

| | | |
|---|---|---|
| Re. 23,394 | Logmann et al. | July 24, 1951 |
| 744,772 | Lee | Nov. 24, 1903 |
| 764,719 | Gorton | July 12, 1904 |
| 1,099,137 | Williams | June 2, 1914 |
| 1,543,161 | Hull | June 23, 1925 |
| 1,923,657 | Beers | Aug. 22, 1933 |
| 2,051,381 | Kivlin | Aug. 18, 1936 |
| 2,061,023 | Cohen | Nov. 17, 1936 |
| 2,072,118 | Mantle | Mar. 2, 1937 |
| 2,226,667 | Love | Dec. 31, 1940 |
| 2,389,375 | Lundholm | Nov. 20, 1945 |
| 2,559,240 | Wiggin | July 3, 1951 |
| 2,570,368 | Moon | Oct. 9, 1951 |
| 2,623,477 | Tuttle | Dec. 30, 1952 |